Patented Mar. 17, 1931

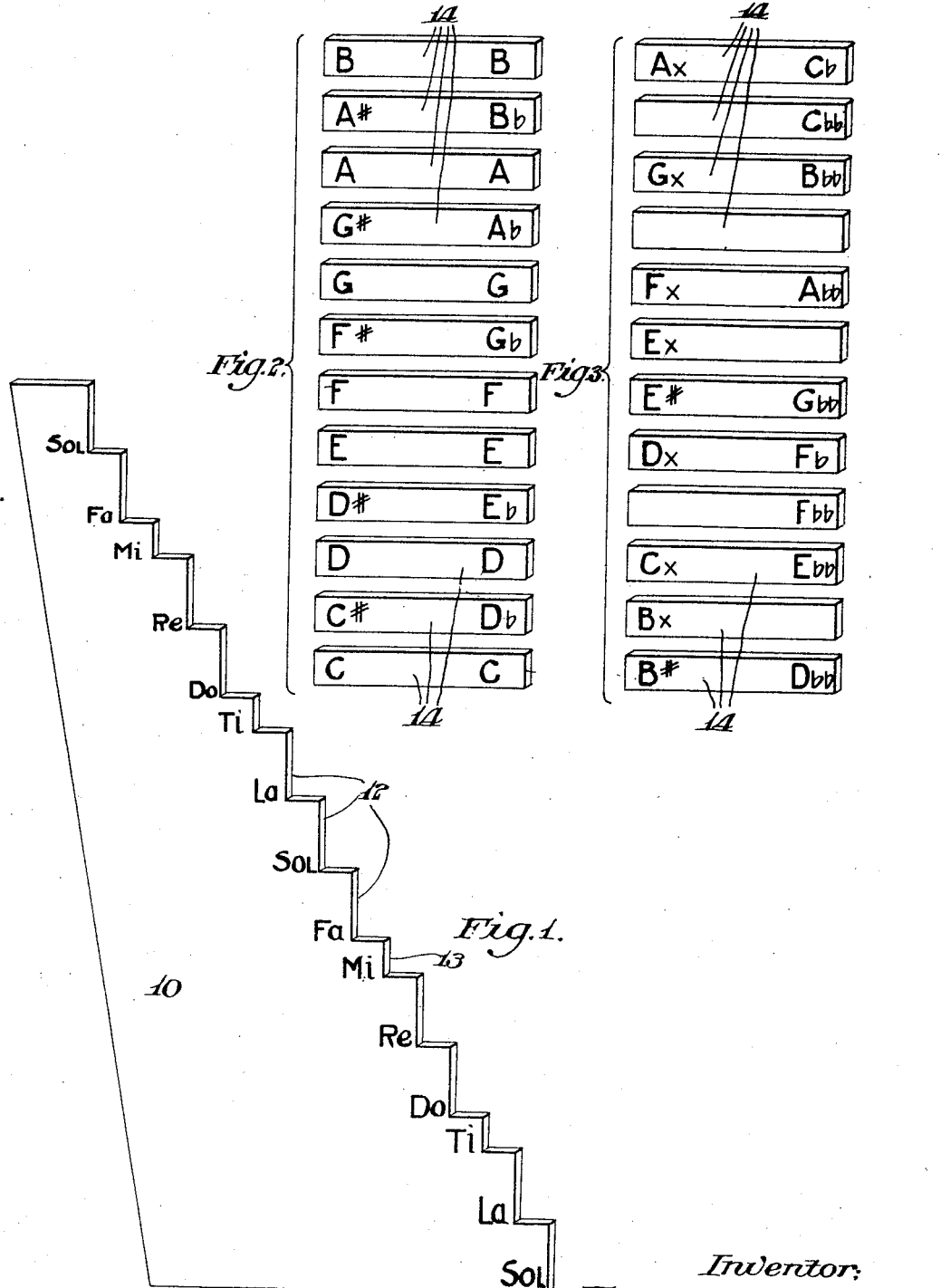

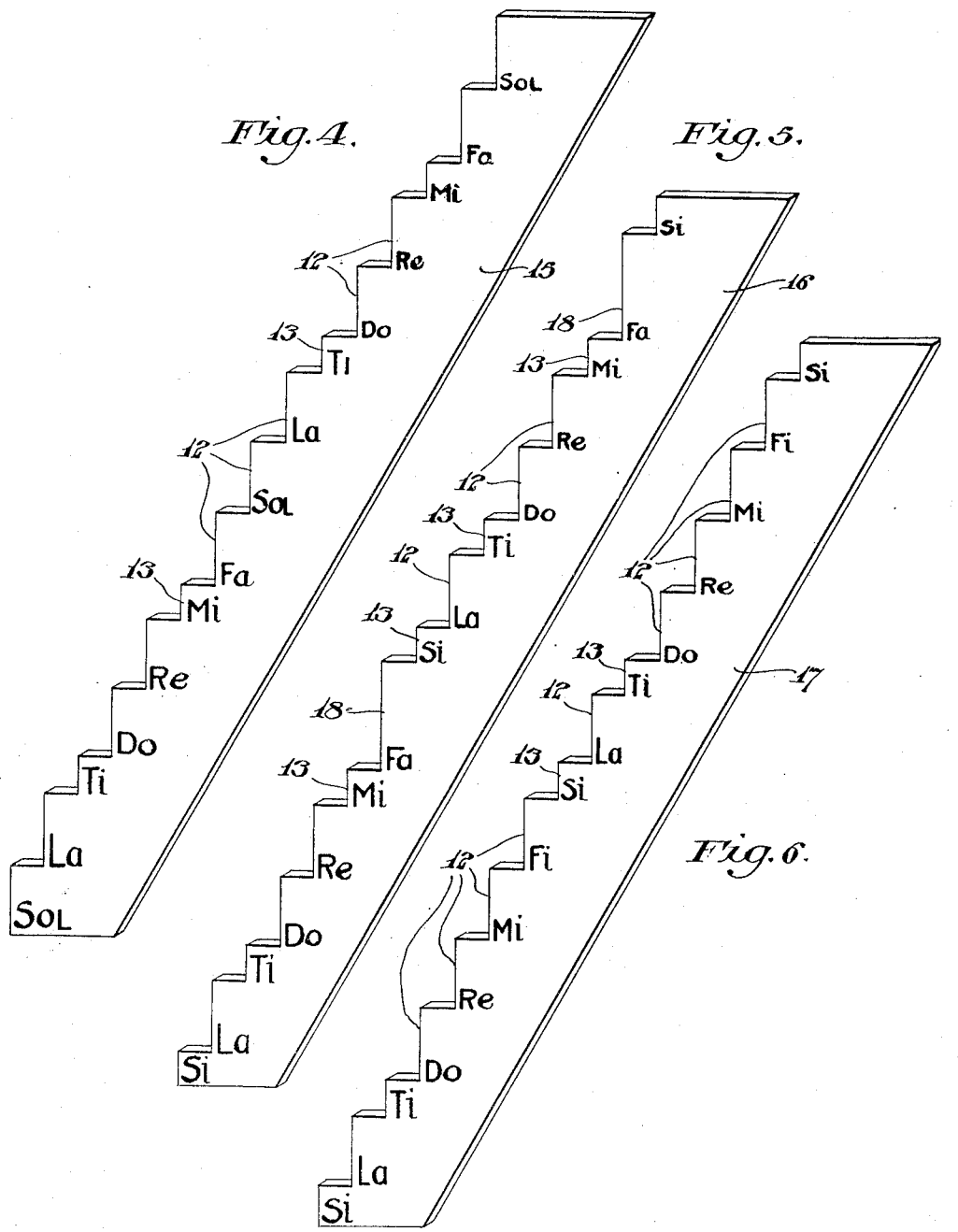

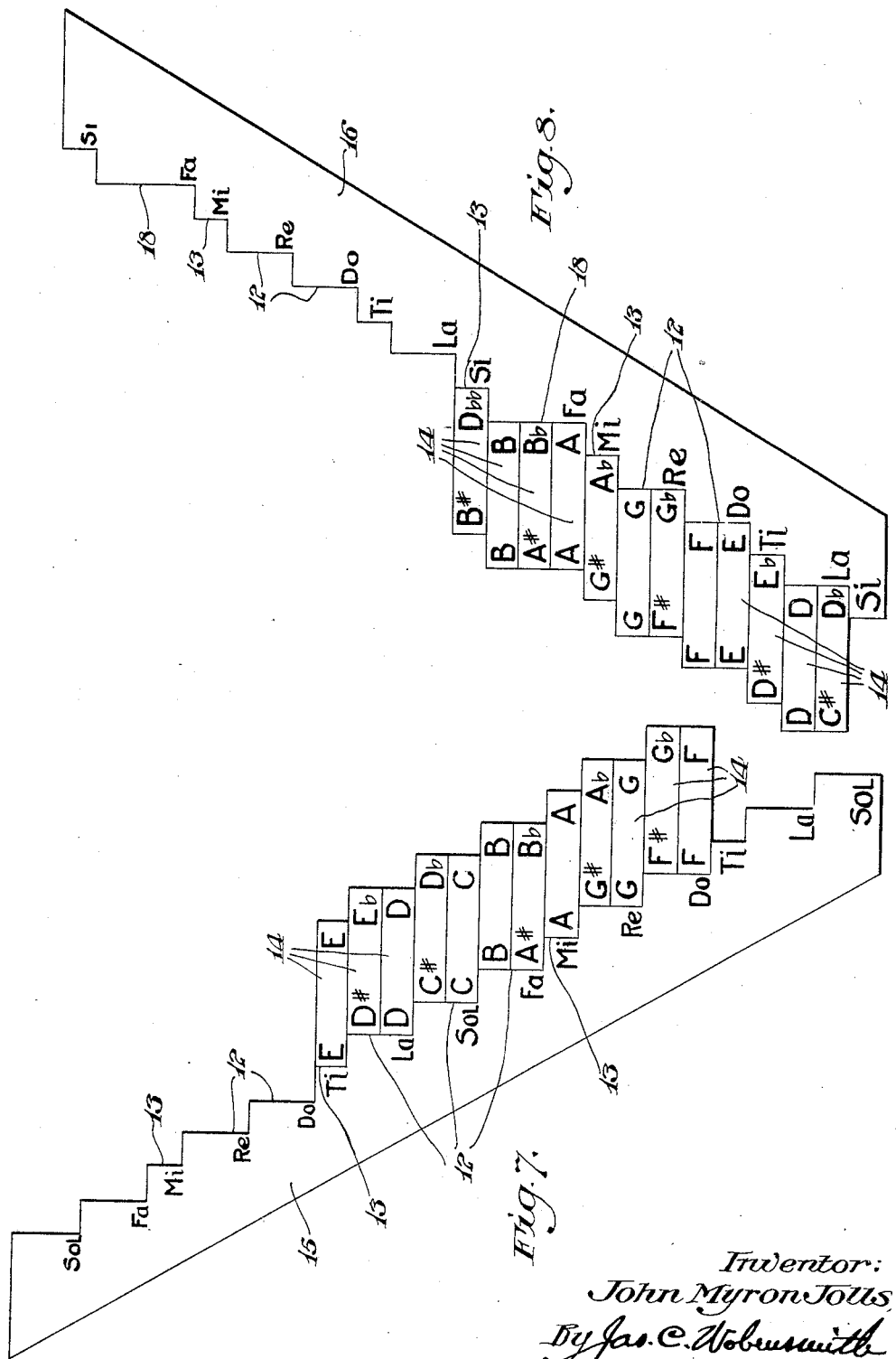

1,796,845

UNITED STATES PATENT OFFICE

JOHN MYRON JOLLS, OF PHILADELPHIA, PENNSYLVANIA

APPARATUS FOR TEACHING MUSIC

Application filed March 12, 1928. Serial No. 260,941.

My invention relates to apparatus for teaching music, which will be particularly adaptable for quickly and efficiently teaching the various musical scales and the intervals occurring therein, to groups or classes, where the individuals comprising such groups or classes may or may not have had any previous musical instruction.

It is, of course, well understood by those skilled in the art, that there are two great divisions of musical scales—the chromatic scale, comprising all semitones; and the diatonic scale, comprising certain successions of whole tones and semitones in definite order.
The diatonic scales at present in most common use are the major, and four forms of the minor—the natural or normal minor; the harmonic minor; the melodic minor ascending and descending; and the melodic minor ascending as a melodic and descending as a natural minor. The difference between these various scales is caused by the different arrangement of the whole tones and semitones making up the same.
My present invention contemplates the provision of certain devices adapted to be used and arranged in conjunction with each other, whereby the intervals occurring in the various musical scales may be impressed upon the minds of the students, both visually and contactually.

The object of my present invention is to provide improved apparatus for teaching music which will be particularly adaptable for use in the instruction of individuals or classes in the various musical scales and the intervals occurring therein, whereby the same will be impressed upon the minds of the students more readily than has heretofore been possible, particularly in school work.

The nature and characteristic features of my invention will be more readily understood from the following description, taken in connection with the accompanying drawings forming part hereof, in which:

Figure 1 is a perspective view of a portion of the apparatus of my invention, comprising a device having notches or steps formed on one edge thereof to represent the succession of whole tones and semitones in a diatonic major scale, said steps covering two octaves;

Fig. 2 is a perspective view of another portion of the apparatus of my invention, comprising a group of blocks adapted to be arranged in a series, each block representing a pitch and having its pitch names designated thereon, which blocks when placed in proper consecutive order will indicate a chromatic scale;

Fig. 3 is a view similar to Fig. 2, but with each of the blocks turned over, to show on the reverse side of certain of the blocks other designations for the pitches represented thereby;

Fig. 4 is a perspective view of another portion of the apparatus of my invention, comprising a device having notches or steps formed on one edge thereof, similar to those formed on the device shown in Fig. 1 of the drawings, and likewise representing the succession of whole tones and semitones in a diatonic major scale, but being of slightly larger dimensions and adapted to be used, if desired, in conjunction with the blocks shown in Figs. 2 and 3 of the drawings, by having the ends of said blocks placed against the vertical extensions of said steps in a certain order;

Fig. 5 is a perspective view of a device similar to that shown in Fig. 4, but with notches or steps formed on one edge thereof to represent the succession of whole tones and semitones in a diatonic harmonic minor scale;

Fig. 6 is a perspective view of another device similar to that shown in Fig. 4, but with notches or steps formed on one edge thereof to represent the succession of whole tones and semitones in a diatonic melodic minor scale;

Fig. 7 is a plan view of the portion of the apparatus shown in Fig. 4 of the drawings, illustrating the use thereof in conjunction with the blocks shown in Fig. 2, said blocks being shown so arranged as to form the major scale of "F"; and Fig. 8 is a plan view of the portion of the apparatus shown in Fig. 5 of the drawings, illustrating the use thereof in conjunction with the blocks shown in Figs. 2 and 3, said blocks being so arranged as to form the harmonic minor scale of "C-sharp".

Referring to the drawings, in Fig. 1 there is illustrated a form or embodiment of my invention comprising a flat member 10, preferably made of press board or the like, and having notches or steps formed on one edge thereof to represent the succession of whole tones and semitones in a diatonic major scale.

It will be noted that the horizontal extensions 11 of the steps are preferably made equal, but the vertical extensions of said steps are varied to represent the intervals between the pitches comprising such scale, the long vertical extensions 12 representing whole tones, and the short vertical extensions 13 representing semitones.

Opposite each step is the syllable name of the relative pitch represented thereby, as "Do", "Re", "Mi", etc. It will, of course, be understood that by varying the positions of the long and short steps, on devices similar to that illustrated in Fig. 1, the relationship of the pitches in various other scales may be indicated.

Referring now more particularly to Fig. 2 of the drawings, there is there illustrated a series of blocks 14, each representing a pitch and each having its several pitch names designated thereon. These blocks, when placed in consecutive order, as shown in the drawings, will indicate a chromatic scale. However, by arranging the same in step-like form, to represent whole tones and semitones, any of the diatonic scales may be indicated, which scales, of course, may be started on any keynote desired.

It will be seen that these blocks are designated according to the various pitch names, as "A", "B", "C", etc. As certain of the sharped pitches are regarded as having the same tone as certain of the flatted pitches, the blocks representing such pitches have both pitch names designated thereon, the "sharps" on the left hand side, and the "flats" on the right hand side, for a purpose to be hereinafter explained.

The blocks 14 are also adapted to be used in conjunction with the notched devices illustrated in Figs. 4, 5 and 6 of the drawings, by placing the ends of said blocks against the vertical extensions of the steps formed on said devices, in the proper successive order, and when so used in conjunction with said devices, each of said blocks is made of the same width as the vertical extension of each step representing a semitone. Two of the blocks will, of course, be placed against the vertical extension of a step representing a whole tone, and three against the vertical extension of a step representing three semitones (see Figs. 7 and 8).

In Fig. 3 of the drawings, there is illustrated the same series of blocks as in Fig. 2, but turned over to show on the reverse side of certain of the blocks other designations for the pitches represented by the respective blocks. It is, of course, well known that every scale must contain seven pitch names, and these other designations for various pitches will be necessary in forming scales containing a large number of sharps or flats.

In Fig. 4 of the drawings there is shown a device 15, having notches or steps formed on one edge thereof, similar to those formed on the device 10 shown in Fig. 1 of the drawings, and also representing the succession of whole tones and semitones in a diatonic major scale, that is to say, the vertical extensions of said steps representing the intervals between the pitches comprising such scale, the long steps representing whole tones, and the short steps semitones.

In Figs. 5 and 6 of the drawings there are shown devices, 16 and 17 respectively, similar to the device 15 shown in Fig. 4, with the exception that these devices have notches or steps formed on one edge thereof representing the succession of whole tones and semitones in a diatonic harmonic minor and a diatonic melodic minor scale, respectively.

It will be noted that in the harmonic minor scale, there occurs an interval of three semitones. Consequently, the device 16 is provided with steps having vertical extensions 18 of a size corresponding to three semitones (see Figs. 5 and 8).

On each side of each of the devices 15, 16 and 17, opposite each step, is the syllable name of the relative pitch represented thereby, as "Do", "Re", "Mi", etc., similar to the designations on the device 10.

The devices 15, 16 and 17, illustrated in Figs. 4, 5 and 6 of the drawings, respectively, are made on a slightly larger scale than the device 10 illustrated in Fig. 1 of the drawings, as said device 10 is preferably intended to be used by having the fingers of the students placed on the steps formed thereon, while the devices 15, 16 and 17 are preferably intended to be used in conjunction with the series of blocks 14, in which case the vertical extensions of the various steps are adapted to accommodate one, two or three blocks, according to the length of the interval.

While the blocks 14 could, if desired, be made of such width as to be used in conjunction with the notched device 10, illustrated in Fig. 1 of the drawings, it will be found in practice that blocks of such width could not be so conveniently manipulated. Likewise, the devices 15, 16 and 17 may be used without the blocks 14, if desired, by placing the fingers on the various steps, as with the device 10.

The use of my invention in connection with the teaching of singing may now be explained. The notched device 10, illustrated in Fig. 1, is given to the student immediately after he has learned to sing a major scale by rote. He then sings said scale, at the same time placing one of his fingers successively on the steps formed on said device, beginning on the step designated "Do".

After doing the above a number of times, he sings various intervals of the scale, at the same time placing his finger on the proper steps. He thus becomes familiar with the relationship of the pitches in a major scale, and is then ready to use the other parts of the apparatus of my invention.

Although, in practice, devices such as that illustrated in Fig. 1, which are used by having the fingers placed on the steps while singing various pitches, are formed to represent only the major scale, it will be understood that other devices, having notches or steps formed to represent the various minor scales, may also be provided to be used in this manner if desired.

The student is given the blocks 14, illustrated in Figs. 2 and 3. He may arrange the same in consecutive order, beginning with any block, and thus learn to form a chromatic scale, as "C", "C-sharp", "D", "D-sharp", etc. He may also use said blocks in conjunction with the notched devices 15, 16 and 17, selecting the particular device which is notched to represent the scale to be formed, and laying the same on a plane surface such as the top of a desk or table.

If it is a major scale, one end of the block 14 representing the keynote or tonic of said scale to be formed is placed against the vertical extension of the step opposite the syllable "Do" on the notched device 15, representing a major scale, to the right of the device if the scale to be formed is a flat scale, and to the left of the device if the same is a sharp scale. In forming the major scale of "C", which is neutral, the blocks 14 may be placed either to the right or to the left of the notched device 15.

The other blocks 14 are then arranged one above the other in proper successive order with their ends against the vertical extensions of said steps, the full series of said blocks being used, thereby to impress upon the student the length of the intervals between the various pitches. By reading the outside character on the lowermost block on each step, the pitches of the scale will be named.

As the characters designating sharped pitches are placed on the left hand side of the blocks 14, and the characters designating flatted pitches are placed on the right hand side of said blocks, the reason for placing the notched device 15 to the left of the blocks 14 when forming a flat scale, and to the right of said blocks when forming a sharp scale, will be apparent.

In Fig. 7 of the drawings, there is illustrated such use of the blocks 14 in conjunction with the notched device 15, representing a major scale, to form in this instance the major scale of "F". As this is a flat scale, the blocks 14 are placed to the right of the notched device 15; and as it is a major scale, the keynote or tonic of the same is placed opposite the syllable "Do" on said device 15.

If the scale to be formed is a minor, one end of the block 14 representing the keynote or tonic of the same is placed against the vertical extension of the step opposite the syllable "La" on the notched device representing whatever minor it is desired to form. The other blocks are then arranged in proper successive order, the blocks to the right of the notched device if the scale to be formed is a flat scale, and to the left of the notched device if the same is a sharp scale.

In Fig. 8 there is illustrated the use of the blocks 14 in conjunction with the notched device 16, representing a harmonic minor scale, to form in this instance the harmonic minor scale of "C-sharp". As this is a sharp scale, the blocks are placed to the left of the notched device 16; also, as it is a minor scale, the keynote or tonic of the same is placed opposite the syllable "La" on said notched device, and as the scale contains a large number of sharps, one of the blocks 14 is turned over, to indicate other designations for the pitch which it represents, which is necessary in this scale to bring out the several pitch names required.

The blocks 14 may also be used separately, if desired, to form various diatonic scales, by arranging the same in steplike form. For example, to form the major scale of "C", the ends of the blocks designated "C" and "C-sharp" are placed in one straight vertical line; the ends of the blocks designated "D" and "D-sharp" are placed in another straight vertical line, slightly indented from the line of the first two blocks; the end of the block designated "E" is still further indented, etc.

Thus, by reading the designation at the proper end of the lowermost block on each step, each of the pitches of said scale will be read. It will be understood that two blocks having their ends in a single straight line represent an interval of a whole tone between the lower of said two blocks and the lowermost block on the next step.

The use of my invention is described above as adapted for the teaching of music, particularly musical scales and the intervals occurring therein, in connection with singing. It will, of course, be understood that my invention may also be applied to any other form of musical expression, such as reading, composing, or instrumental performance.

There have hereinbefore been mentioned four forms of the minor scale. However, there are illustrated but two forms of the same (the harmonic, and the melodic ascending and descending), for reasons which will now be explained.

As is well known, the natural or normal minor is formed exactly like the major, except that its keynote or tonic is "La", three semitones below the major tonic "Do". It has therefore not been thought necessary to illustrate any notched device for forming this scale, as the same may be formed by placing the block 14, designating the pitch which is to be the keynote or tonic of the same, on the step opposite the syllable "La" on the device 15, notched to represent a major scale.

Reference has also been made to a melodic minor scale ascending as a melodic, and descending as a natural minor. It will be readily apparent that this scale may be formed by using the notched device 17, representing a melodic minor scale, for ascending the scale, and the notched device 15, representing a major scale, for descending the scale, starting with the minor tonic "La".

It will be seen that there is thus provided apparatus for teaching music, which will be adaptable for instructing either individuals or classes in the formation of the various scales, and which will impart to the minds of the students, by visualization and contact, the intervals between the pitches in the various scales.

Having thus described the nature and characteristic features of my invention, what I claim as new and desire to secure by Letters Patent, is:

1. Apparatus for teaching music comprising a device having steps formed along one edge thereof to indicate the interval relationship of the pitches in a certain scale, a sufficient number of such steps being provided to cover more than one octave, the extensions of said steps in one direction being varied in proportion to the musical intervals between the pitches comprising such scale, and said device having designated thereon at the various steps the respective syllable names of the relative pitches of the scale.

2. Apparatus for teaching music comprising a device having steps formed along one edge thereof to indicate the interval relationship of the pitches in a certain scale, a sufficient number of such steps being provided to cover more than one octave, the extensions of said steps in one direction being substantially equal and the extensions of said steps in the other direction being varied in proportion to the musical intervals between the pitches comprising such scale, and said device having designated thereon at the various steps the respective syllable names of the relative pitches of the scale.

3. Apparatus for teaching music comprising a plurality of devices each having steps formed along one edge thereof to indicate the interval relationship of the pitches in a certain scale, a sufficient number of such steps being provided to cover more than one octave, the extensions of said steps in one direction being substantially equal and the extensions of said steps in the other direction being varied in proportion to the musical intervals between the pitches comprising such scale, and each of said devices having designated thereon at the various steps the respective syllable names of the relative pitches of the scale.

4. Apparatus for teaching music comprising a series of blocks each representing a musical pitch and having its several pitch names designated thereon, the character on each of said blocks designating a sharped pitch appearing at the opposite end from the character designates a flatted pitch, and the characters representing sharped and flatted pitched respectively appearing at corresponding places on said blocks.

5. Apparatus for teaching music comprising a series of blocks each representing a musical pitch and having its several pitch names designated thereon, the character on each of said blocks designating a sharped pitch appearing at the opposite end from the character designating a flatted pitch, and certain of said blocks having still other designations on the reverse faces thereof for the pitches respectively represented by such blocks, and the characters representing sharped and flatted pitches respectively appearing at corresponding places on the respective faces of said blocks.

6. Apparatus for teaching music comprising a series of blocks each representing a musical pitch and having its several pitch names designated thereon, the character on each of said blocks designating a sharped pitch appearing at the opposite end from the character designating a flatted pitch, and certain of said blocks having still other designations on the reverse faces thereof for the pitches respectively represented by such blocks, and on the reverse face of each of such blocks the character designating a sharped pitch appearing at the opposite end from the character designating a flatted pitch, and the characters representing sharped and flatted pitches respectively appearing at corresponding places on the respective faces of said blocks.

7. Apparatus for teaching music comprising a device having steps formed along one edge thereof to indicate the interval relationships of the pitches in a certain scale, the extensions of said steps in one direction being varied in proportion to the number of semitones in the musical intervals between the pitches comprising such scale; and a series of blocks each representing a musical pitch and having its several pitch names designated thereon; said blocks being of a width corresponding to the vertical extensions which represent semitones in the steps on the other device; and the ends of said blocks being adapted to be placed against said vertical extensions, the blocks being arranged in proper successive order to indicate the various pitches in the scale.

8. Apparatus for teaching music comprising a device having steps formed along one edge thereof to indicate the interval relationship of the pitches in a certain scale, the extensions of said steps in one direction being varied in proportion to the number of semitones in the musical intervals between the pitches comprising such scale; and a series of blocks each representing a musical pitch and having its several pitch names designated thereon, the character on each of said blocks designating a sharped pitch appearing at the opposite end from the character designating a flatted pitch, and certain of said blocks having still other designations on the reverse sides thereof for the pitches respectively represented by such blocks, and on the reverse side of each of such blocks the character designating a sharped pitch appearing at the opposite end from the character designating a flatted pitch; said blocks being of a width corresponding to the vertical extensions which represent semitones in the steps on the other device; and the ends of said blocks being adapted to be placed against said vertical extensions, the blocks being arranged in proper successive order to indicate the various pitches in the scale.

9. Apparatus for teaching music comprising a device having steps formed along one edge thereof to indicate the interval relationship of the pitches in a certain scale, the extensions of said steps in one direction being varied in proportion to the number of semitones in the musical intervals between the pitches comprising such scale, said device having designated thereon at the various steps the respective syllable names of the relative pitches of the scale; and a series of blocks each representing a musical pitch and having its several pitch names designated thereon, the character on each of said blocks designating a sharped pitch appearing at the opposite end from the character designating a flatted pitch, and certain of said blocks having still other designations on the reverse side thereof for the pitches respectively represented by such blocks, and on the reverse side of each of such blocks the character designating a sharped pitch appearing at the opposite end from the character designating a flatted pitch; said blocks being of a width corresponding to the vertical extensions which represent semitones in the steps on the other device; and the ends of said blocks being adapted to be placed against said vertical extensions, the blocks being arranged in proper successive order to indicate the various pitches in the scale.

10. Apparatus for teaching music comprising a device having steps formed along one edge thereof to indicate the interval relationship of the pitches in a certain scale, the extensions of said steps in one direction being substantially equal and the extensions of said steps in the other direction being varied in proportion to the number of semitones in the musical intervals between the pitches comprising such scale, said device having designated thereon at the various steps the respective syllable names of the relative pitches of the scale; and a series of blocks each representing a musical pitch and having its several pitch names designated thereon, the character on each of said blocks designating a sharped pitch appearing at the opposite end from the character designating a flatted pitch, and certain of said blocks having still other designations on the reverse sides thereof for the pitches respectively represented by such blocks, and on the reverse side of each of such blocks the character designating a sharped pitch appearing at the opposite end from the character designating a flatted pitch; said blocks being of a width corresponding to the vertical extensions which represent semitones in the steps on the other devices; and the ends of said blocks being adapted to be placed against said vertical extensions, the blocks being arranged in proper successive order to indicate the various pitches in the scale.

11. Apparatus for teaching music comprising a plurality of devices each having steps formed along one edge thereof to indicate the interval relationship of the pitches in a certain scale, the extensions of said steps in one direction being substantially equal and the extensions of said steps in the other direction being varied in proportion to the number of semitones in the musical intervals between the pitches comprising such scale, each of said devices having designated thereon at the various steps the respective syllable names of the relative pitches of the scale; and a series of blocks each representing a musical pitch and having its several pitch names designated thereon, the character on each of said blocks designating a sharped pitch appearing at the opposite end from the character designating a flatted pitch, and certain of said blocks having still other designations on the reverse sides thereof for the pitches respectively represented by such blocks, and on the reverse side of each of such blocks the character designating a sharped pitch appearing at the opposite end from the character designating a flatted pitch; said blocks being of a width corresponding to the vertical extensions which represent semitones in the steps on the other devices; and the ends of said blocks being adapted to be placed against said vertical extensions, the blocks being arranged in proper successive order to indicate the various pitches in the scale.

In testimony whereof, I hereunto sign my name.

JOHN MYRON JOLLS.